(12) United States Patent
Tsukigi

(10) Patent No.: US 9,958,329 B2
(45) Date of Patent: May 1, 2018

(54) PHOTOELECTRIC SWITCH

(71) Applicant: Keyence Corporation, Osaka (JP)

(72) Inventor: Shinichi Tsukigi, Osaka (JP)

(73) Assignee: Keyence Corporation, Osaka (JP)

( * ) Notice: Subject to any disclaimer, the term of this patent is extended or adjusted under 35 U.S.C. 154(b) by 65 days.

(21) Appl. No.: 15/257,938

(22) Filed: Sep. 7, 2016

(65) Prior Publication Data
US 2017/0102271 A1 Apr. 13, 2017

(30) Foreign Application Priority Data

Oct. 8, 2015  (JP) .................................. 2015-200554
Oct. 8, 2015  (JP) .................................. 2015-200555

(51) Int. Cl.
*H05B 37/02*  (2006.01)
*G01J 3/36*  (2006.01)
*G01J 3/46*  (2006.01)
*G01J 3/10*  (2006.01)
*G01J 3/50*  (2006.01)
(Continued)

(52) U.S. Cl.
CPC ............. *G01J 3/463* (2013.01); *G01J 3/0286* (2013.01); *G01J 3/10* (2013.01); *G01J 3/36* (2013.01); *G01J 3/50* (2013.01); *G01J 3/513* (2013.01); *G05B 19/401* (2013.01); *G05B 19/404* (2013.01); *G01J 2003/1213* (2013.01);
(Continued)

(58) Field of Classification Search
CPC  H05B 33/08; H05B 33/0845; H05B 33/0866; H05B 37/02; H05B 37/0218; H05B 37/0227; H05B 37/029; F21V 29/70; F21V 5/04; F21V 9/08; H03K 17/941; F21Y 2115/10; H01J 40/14; G05G 19/02; G01J 3/463; G01J 3/0286; G01J 3/10; G01J 3/36; G01J 3/50
USPC ..... 315/149–159, 209 R, 291, 307; 340/540, 340/555–557; 250/221, 221.1, 227.11
See application file for complete search history.

(56) References Cited

U.S. PATENT DOCUMENTS 5,270,541 A * 12/1993 Matuzaki ............. H03K 17/943
                                                         250/227.11
6,124,936 A    9/2000 Okamoto
(Continued)

FOREIGN PATENT DOCUMENTS

JP    2000-121440 A    4/2000
JP    2000-121441 A    4/2000
(Continued)

*Primary Examiner* — Jimmy Vu
(74) *Attorney, Agent, or Firm* — Kilyk & Bowersox, P.L.L.C.

(57) ABSTRACT

There is provided a photoelectric switch capable of accurately detecting even such a workpiece where a tint changes within the same workpiece, while preventing erroneous detection. The photoelectric switch includes: a light projecting unit; a light receiving unit; a coincidence degree calculating unit for comparing the acquired color information with a reference color to calculate a coincidence degree of both of the color information. When the color information is newly acquired, a detection signal generating unit compares, with a detection determination threshold, the highest coincidence degree of coincidence degrees calculated by respectively comparing the color information newly acquired, with the two or more reference colors, to perform workpiece determination.

14 Claims, 9 Drawing Sheets

(51) Int. Cl.
    *G01J 3/51*            (2006.01)
    *G05B 19/401*       (2006.01)
    *G05B 19/404*       (2006.01)
    *G01J 3/02*            (2006.01)
    G09G 3/04            (2006.01)
    G01J 3/12            (2006.01)
    G01J 3/28            (2006.01)

(52) U.S. Cl.
    CPC . *G01J 2003/2833* (2013.01); *G01J 2003/466* (2013.01); *G09G 3/04* (2013.01)

(56) References Cited

U.S. PATENT DOCUMENTS

| | | | |
|---|---|---|---|
| 6,323,481 | B2 | 11/2001 | Ueki |
| 6,392,214 | B1 | 5/2002 | Okamoto |
| 7,098,441 | B2 | 8/2006 | Yamaguchi et al. |
| 2014/0131555 | A1* | 5/2014 | Iida .................. G01J 1/4228 250/208.2 |
| 2015/0108376 | A1 | 4/2015 | Kawaguchi |
| 2017/0102266 | A1 | 4/2017 | Tsukigi et al. |
| 2017/0171935 | A1 | 6/2017 | Inubushi et al. |

FOREIGN PATENT DOCUMENTS

| | | |
|---|---|---|
| JP | 2005-127869 A | 5/2005 |
| JP | 2005-291748 A | 10/2005 |
| JP | 2008-175743 A | 7/2008 |

\* cited by examiner

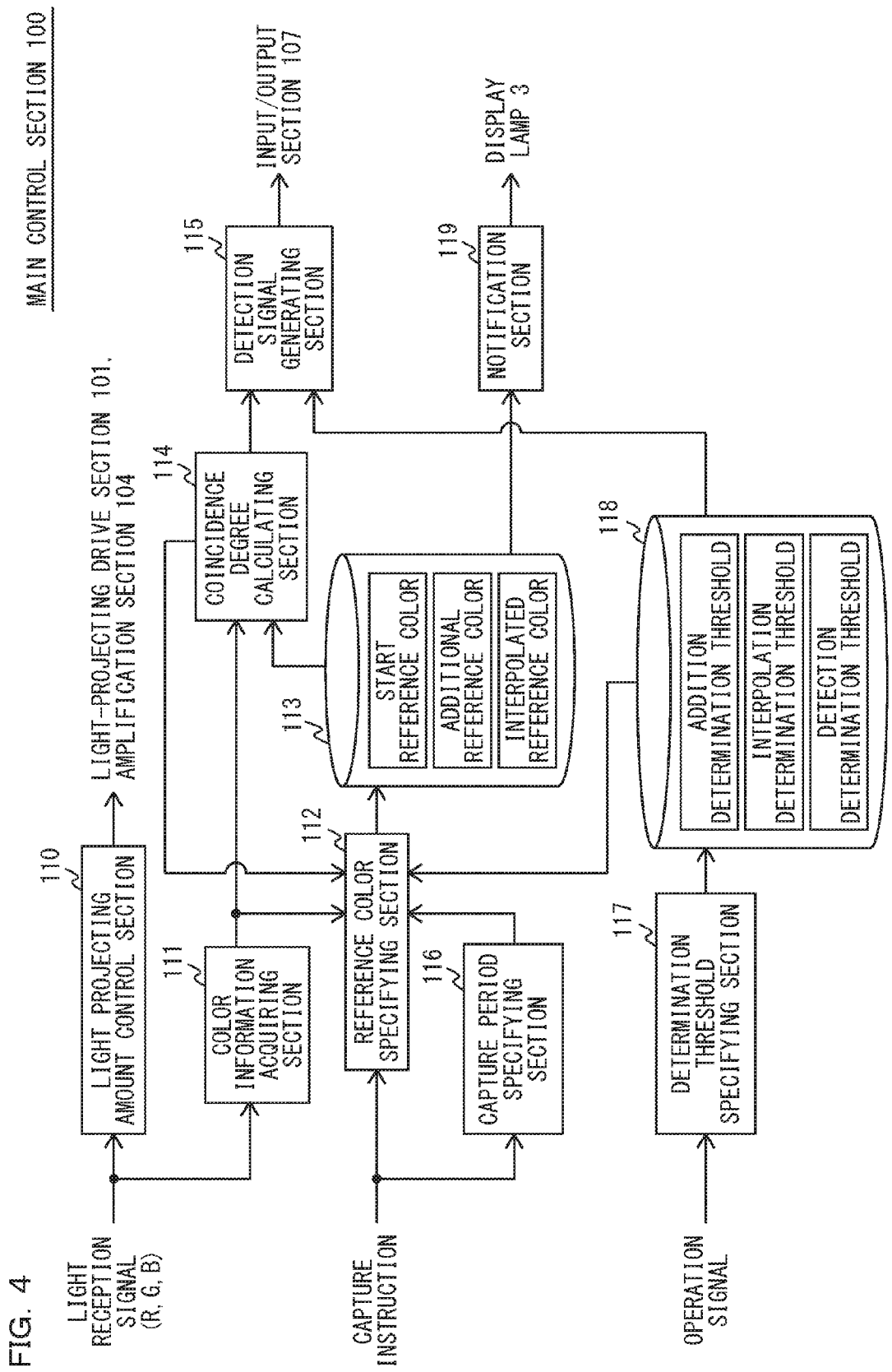

FIG. 5A  PRESENT INVENTION
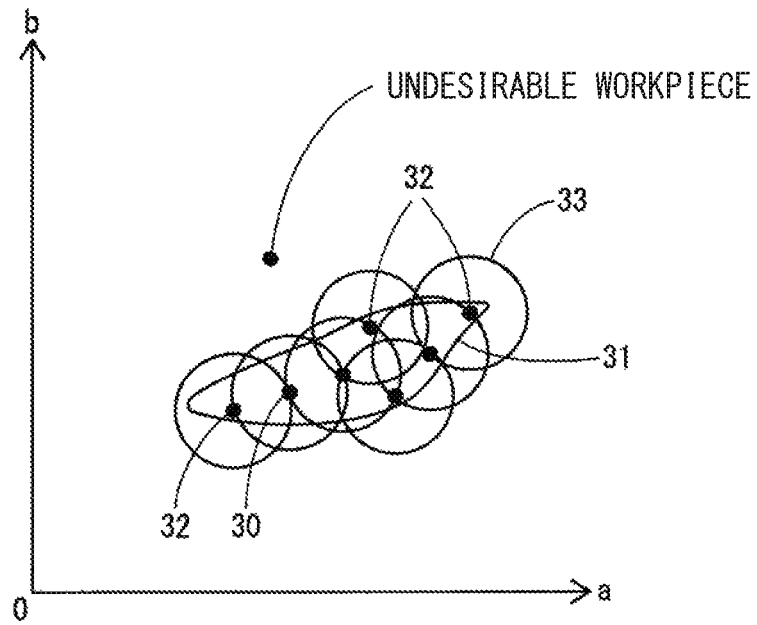
FIG. 5B  COMPARATIVE EXAMPLE
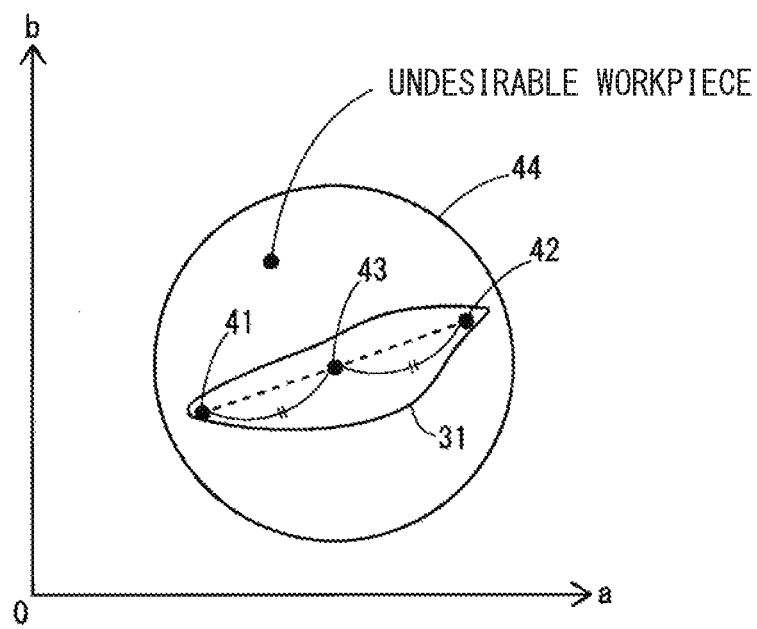

PHOTOELECTRIC SWITCH

CROSS-REFERENCE TO RELATED APPLICATIONS

The present application claims foreign priority based on Japanese Patent Applications No. 2015-200554, filed Oct. 8, 2015 and No. 2015-200555, filed Oct. 8, 2015, the contents of which is incorporated herein by reference.

BACKGROUND OF THE INVENTION

1. Field of the Invention

The present invention relates to a photoelectric switch, and more specifically relates to improvement in photoelectric switch that receives reflected light from a detection area to acquire color information and performs workpiece determination.

2. Description of Related Art

A photoelectric switch is a detector for detecting a workpiece by use of light. The photoelectric switch projects detected light, and receives light reflected by or light transmitted through a workpiece, or some other light, to perform workpiece determination. Based on the result of the workpiece determination, the photoelectric switch generates a detection signal. Types of the photoelectric switch include: a light receiving amount-type photoelectric switch that performs workpiece determination by use of a light receiving amount of reflected light or transmitted light from a detection area including a workpiece; a distance measurement-type photoelectric switch that measures a distance to the workpiece to perform workpiece determination, and a color discrimination-type photoelectric switch that performs workpiece determination by discriminating colors of the workpiece surface.

The light receiving amount-type photoelectric switch performs workpiece discrimination through use of variation in light receiving amount due to a difference in reflectance or color of the workpiece surface, a difference in distance to the workpiece, a difference in tilt (tilt angle) of the workpiece surface, or the like. This is a general-purpose photoelectric switch applicable to a large number of uses.

Meanwhile, the distance measurement-type photoelectric switch measures a characteristic in accordance with the shape of the workpiece as a distance to the workpiece, to perform the workpiece determination. This is less susceptible to variation in reflectance and color of the workpiece surface or variation in tilt (tilt angle) of the workpiece surface. Further, the color discrimination-type photoelectric switch performs the workpiece determination by use of the color of the workpiece surface. This is less susceptible to variation in reflectance of the workpiece surface, variation in distance to the workpiece, or variation in tilt (tilt angle) of the workpiece surface.

A conventional color discrimination-type photoelectric switch is provided with three light emitting elements for respectively generating red, green, and blue detected light, and one light receiving element for receiving reflected light to generate a light reception signal (e.g., Unexamined Japanese Patent Publication No. 2000-121440, Unexamined Japanese Patent Publication No. 2000-121441, Unexamined Japanese Patent Publication No. 2005-127869, and Unexamined Japanese Patent Publication No. 2005-291748). In this sort of photoelectric switch, based on light receiving amount levels $R_k$, $G_k$, $B_k$ of the three colors, obtained by sequentially turning on the respective light emitting elements in a time-division manner, colors are represented by ratios of the light receiving amount levels of the three colors: $r_k = R_k/M_k$, $g_k = G_k/M_k$, $b_k = B_k/M_k$ (a sum of the light receiving amounts: $M_k = R_k + G_k + B_k$). It is then determined whether or not ratios $r_1$, $g_1$, $b_1$ of the light receiving amount levels corresponding to the colors of the workpiece are coincident with ratios $r_0$, $g_0$, $b_0$ of the light receiving amount levels corresponding to previously registered reference colors. Specifically, the ratio of the light receiving amount level of each color is compared with the ratio of the light receiving amount level of the reference color, to obtain a coincidence degree of the two pieces of color information. This coincidence degree is compared with a threshold for determination, to perform the workpiece determination.

The light receiving amount level of the reference color is defined based on the light receiving amount level of each color acquired at the timing instructed by the user. For example, based on a plurality of light receiving amount levels acquired within a predetermined period or on the ratios of the light receiving amount levels, the maximum value and the minimum value are obtained for each color component, and a median value of the maximum value and the minimum value is specified as the light receiving amount level of the reference color or the ratio of the light receiving amount level.

The conventional photoelectric switch described above uses the coincidence degree for the color discrimination to represent color information, which is normally represented by three parameters, by one parameter as the coincidence degree. Hence this photoelectric switch can be handled in a similar manner to the light receiving amount-type photoelectric switch that discriminates color information by use of a light receiving amount and a threshold, and the setting can be simply made. On the other hand, for accurately detecting such a workpiece where a tint changes within the same workpiece in the conventional photoelectric switch, for example, even when the reference color which has been defined from the maximum value and the minimum value obtained for each color component is used, the threshold for determination of the conventional photoelectric switch is required to be set sufficiently low in accordance with an amount of change in tint. That is, in the conventional photoelectric switch, even when an optimal reference color is obtained, even a workpiece with a color having a low coincidence degree with respect to the reference color is discriminated as a workpiece depending on an amount of change in tint, causing deterioration in detection accuracy, which has been problematic. For example in a case where the workpiece surface has color irregularity, a case where a distance to the workpiece varies or the position of the workpiece changes due to flapping or waving of a carrier device, or a case where ambient light is incident, the tint greatly changes even in the same workpiece. There has further been a problem of not being able to accurately detect a desired workpiece due to an influence of variation in tint of the workpiece among manufacturing lots, contamination on the workpiece surface, blurring of a printed $mar_k$, or color degradation, for example.

SUMMARY OF THE INVENTION

The present invention has been made in view of the above circumstances. It is an object of the present invention to provide a photoelectric switch which can accurately detect even such a workpiece where a tint changes within the same workpiece, while preventing erroneous detection, or can accurately detect even such a workpiece where a tint changes among manufacturing lots.

According to one embodiment of the invention, a photoelectric switch includes: a light projecting unit for projecting detected light toward a detection area; a light receiving unit for receiving reflected light from the detection area to generate a light reception signal; a color information acquiring unit for acquiring color information based on two or more light reception signals respectively corresponding to two or more specific wavelengths; a coincidence degree calculating unit for comparing the acquired color information with color information of a reference color to calculate a coincidence degree of both of the color information; a detection signal generating unit for comparing the calculated coincidence degree with a previously defined detection determination threshold to perform workpiece determination, and generating a detection signal based on the result of the workpiece determination; a capture instruction accepting unit for accepting an instruction to capture the reference color; and a reference color specifying unit for specifying two or more reference colors based on the capture instruction. When the color information is newly acquired, the detection signal generating unit compares, with the detection determination threshold, the highest coincidence degree of coincidence degrees calculated by respectively comparing the color information with color information of the two or more reference colors, to perform workpiece determination.

This photoelectric switch is a color discrimination-type photoelectric switch, and performs the workpiece determination by use of two or more reference colors. For this reason, the detection determination threshold can be set high as compared with the case of performing the workpiece determination by use of one reference color. Hence it is possible to accurately detect even such a workpiece where a tint changes within the same workpiece, while preventing erroneous detection.

In addition to the above configuration, a photoelectric switch according to another embodiment of the invention is configured such that the reference color specifying unit takes the color information, acquired within a reference color capturing period defined in accordance with the capture instruction, as color information of a candidate color and compares the coincidence degree between the candidate colors with a previously defined addition determination threshold, to specify the reference color.

With such a configuration, the candidate colors are narrowed down by use of the coincidence degree between the candidate colors, to specify the reference color. For this reason, as compared with the case of specifying all candidate colors acquired within the reference color capturing period as the reference colors, it is possible to reduce a processing load on the workpiece determination at the time of actual operation.

In addition to the above configurations, a photoelectric switch according to still another embodiment of the invention is configured such that the reference color specifying unit specifies a candidate color, acquired first in the reference color capturing period, as a start reference color, and in a case where the candidate color is newly acquired, the reference color specifying unit specifies the candidate color as an additional reference color when the coincidence degree of the candidate color with respect to the start reference color is lower than the addition determination threshold, whereas the reference color specifying unit does not specify the candidate color as the additional reference color when the coincidence degree is not lower than the addition determination threshold.

With such a configuration, the candidate colors are narrowed down to a candidate color, the coincidence degree of which with respect to the start reference color is lower than the addition determination threshold, and specified as the additional reference color. For this reason, as compared with the case of specifying all candidate colors, acquired after specification of the start reference color, as the additional reference colors, it is possible to reduce a processing load on the workpiece determination at the time of actual operation.

In addition to the above configurations, a photoelectric switch according to still another embodiment of the invention is configured such that, when the candidate color is newly acquired, the coincidence degree calculating unit compares the color information of the candidate color with the color information of the start reference color to calculate a coincidence degree, and also compares the color information of the candidate color with the color information of all the additional reference colors specified before the acquirement of the candidate color to calculate coincidence degrees, and the reference color specifying unit compares, with the addition determination threshold, the highest coincidence degree of the coincidence degree with respect to the start reference color and the coincidence degrees with respect to the additional reference colors, to specify the additional reference color.

With such a configuration, the reference colors are narrowed down to a reference color with the highest coincidence degree, to specify the additional reference color. For this reason, as compared with the case of comparing the coincidence degrees with respect to all reference colors with the addition determination threshold, it is possible to reduce a processing load on addition determination as to whether or not to make an addition to the reference color.

In addition to the above configurations, a photoelectric switch according to still another embodiment of the invention includes a display unit for displaying the highest coincidence degree of the coincidence degree with respect to the start reference color and the coincidence degrees with respect to the additional reference colors. With such a configuration, it is possible to move the workpiece or change the position of the workpiece while confirming the coincidence degree to be used for the addition determination as to whether or not to add the candidate color to the reference color. Hence it is possible to improve the operability at the time of setting the reference color.

In addition to the above configurations, a photoelectric switch according to still another embodiment of the invention includes a determination threshold specifying unit for specifying the detection determination threshold and the addition determination threshold based on press operation performed on an operation key. The photoelectric switch is configured such that the display unit displays the detection determination threshold and the addition determination threshold. With such a configuration, by operating the operation key, the detection determination threshold and the addition determination threshold can be arbitrarily specified.

In addition to the above configurations, a photoelectric switch according to still another embodiment of the invention includes a notification unit for notifying addition of the reference color every time the additional reference color is newly specified. With such a configuration, the user can easily distinguish that the reference color has been newly added. For this reason, the user can easily recognize how the workpiece is to be moved, or how the position of the workpiece is to be changed, so as to change the tint and add the reference color. Hence it is possible to significantly improve the operability at the time of setting the reference color for the workpiece determination. Further, while the reference color continues to be added by moving the workpiece or changing the position of the workpiece, the state indicates that the reference colors have been in short. When the reference color is not added even by moving the workpiece or changing the position of the workpiece, the state indicates that reference color capturing operation has been sufficiently performed. Accordingly, the user can determine whether the reference color capturing operation is to be continued or completed by the help of the notification unit.

In addition to the above configurations, a photoelectric switch according to still another embodiment of the invention includes a capture period specifying unit for specifying the reference color capturing period based on press operation performed on an operation key. With such a configuration, by operating the operation key, the reference color capturing period can be arbitrarily specified, to thereby improve the operability at the time of setting the reference color.

The photoelectric switch according to one embodiment of the invention includes: a light projecting unit for projecting detected light toward a detection area; a light receiving unit for receiving reflected light from the detection area to generate a light reception signal; a color information acquiring unit for acquiring color information based on two or more light reception signals respectively corresponding to two or more specific wavelengths; a coincidence degree calculating unit for comparing the acquired color information with color information of a reference color to calculate a coincidence degree of both of the color information; a detection signal generating unit for comparing the calculated coincidence degree with a previously defined detection determination threshold to perform workpiece determination, and generating a detection signal based on the result of the workpiece determination; a capture instruction accepting unit for accepting an instruction to capture the reference color; and a reference color specifying unit for specifying a start reference color, an additional reference color, and an interpolated reference color based on the capture instruction. The reference color specifying unit specifies the color information, acquired based on a first one of the capture instruction, as color information of the start reference color, and specifies the color information, acquired based on a second one of the capture instruction after the first capture instruction, as color information of the additional reference color, and specifies one or more than one interpolated reference colors that interpolate color information between the start reference color and the additional reference color based on the color information of the start reference color and the color information of the additional reference color. When the color information is newly acquired, the coincidence degree calculating unit compares the color information with the color information of the start reference color, the color information of the interpolated reference color, and the color information of the additional reference color, to respectively calculate coincidence degrees. The detection signal generating unit compares, with the detection determination threshold, the highest coincidence degree of the coincidence degree with respect to the start reference color, the coincidence degree with respect to the interpolated reference color, and the coincidence degree with respect to the additional reference color, to perform workpiece determination.

This photoelectric switch is a color discrimination-type photoelectric switch, and performs the workpiece determination by use of two or more reference colors. For this reason, as compared with the case of performing the workpiece determination by use of one reference color, the detection determination threshold can be set high. Hence it is possible to accurately detect even such a workpiece where a tint changes among manufacturing lots, while it is possible to prevent erroneous detection.

Further, since one or more than one interpolated reference colors that interpolate color information between the start reference color and the additional reference color are automatically specified, it is possible to spare the trouble of instructing to capture the interpolated reference color. In particular, just specifying two things, the start reference color and the additional reference color, enables addition of tint therebetween as the interpolated reference color. Accordingly, when variation in tint occurs among individuals (e.g., variation among lots), even without preparing all workpieces with variation in tint to set a reference color, just preparing both ends of the variation in tint makes it possible to make a setting so as to allow detection of the tint therebetween.

Further, the interpolated reference color is specified based on the color information of the start reference color and the color information of the additional reference color. For this reason, as compared with the case of setting the interpolated reference color regardless of the coincidence degree between the start reference color and the additional reference color, the number of interpolated reference colors is suppressed, thereby enabling reduction in processing load on the workpiece determination at the time of actual operation.

In addition to the above configuration, the photoelectric switch according to another embodiment of the invention is configured such that the reference color specifying unit specifies the interpolated reference color when the coincidence degree calculated by comparing the color information of the additional reference color with the color information of the start reference color is not higher than a previously defined interpolation determination threshold, and the reference color specifying unit does not specify the interpolated reference color when the coincidence degree is higher than the interpolation determination threshold.

With such a configuration, since the interpolated reference color is specified in accordance with the coincidence degree between the start reference color and the additional reference color, as compared with the case of setting the interpolated reference color regardless of the coincidence degree between the start reference color and the additional reference color, it is possible to reduce a processing load on the workpiece determination at the time of actual operation.

In addition to the above configurations, the photoelectric switch according to still another embodiment of the invention is configured such that when the additional reference color is newly specified, the coincidence degree calculating unit compares the color information of the additional reference color with the color information of the start reference color to calculate a coincidence degree, and also compares the color information of the additional reference color with the color information of all the additional reference color specified before the additional reference color and the color information of the interpolated reference color, to calculate coincidence degrees, and the reference color specifying unit compares, with the interpolation determination threshold, the highest coincidence degree of the coincidence degree with respect to the start reference color, the coincidence degree with respect to the interpolated reference color, and the coincidence degree with respect to the additional reference color, to specify the interpolated reference color.

With such a configuration, the reference colors are narrowed down to a reference color with the highest coincidence degree, to specify the interpolated reference color. For this reason, as compared with the case of comparing the coincidence degrees with respect to all reference colors with the interpolation determination threshold, it is possible to reduce a processing load on interpolation determination as to whether or not to interpolate the reference color.

In addition to the above configurations, the photoelectric switch according to still another embodiment of the invention includes a display unit for displaying the highest coincidence degree of the coincidence degree with respect to the start reference color, the coincidence degree with respect to the interpolated reference color, and the coincidence degree with respect to the additional reference color. With such a configuration, it is possible to move the workpiece or change the position of the workpiece while confirming the coincidence degree to be used for the interpolation determination as to whether or not to interpolate the reference color. Hence it is possible to improve the operability at the time of setting the reference color.

In addition to the above configurations, the photoelectric switch according to still another embodiment of the invention includes a determination threshold specifying unit for specifying the detection determination threshold and the interpolation determination threshold based on press operation performed on an operation key. The photoelectric switch is configured such that the display unit displays the detection determination threshold and the interpolation determination threshold. With such a configuration, by operating the operation key, the detection determination threshold and the interpolation determination threshold can be arbitrarily specified.

In the photoelectric switch according to the present invention, since the workpiece determination is performed using two or more reference colors, it is possible to accurately detect even such a workpiece where a tint changes within the same workpiece, or such a workpiece where a tint changes among manufacturing lots, while it is possible to prevent erroneous detection.

BRIEF DESCRIPTION OF THE DRAWINGS

FIG. 4 is a block diagram showing a configuration example of a main control section 100 of FIG. 3;

FIGS. 5A and 5B are explanatory diagrams showing comparison of operation of the photoelectric switch and that of a comparative example;

DETAILED DESCRIPTION OF PREFERRED EMBODIMENT

Hereinafter, an embodiment of the present invention will be described with reference to the drawings. In the present specification, a description will be given taking a direction of an optical axis (main axis) of a light projecting lens as a front-back direction for the sake of convenience. However, this does not restrict the position of the photoelectric switch according to the present invention when used.

<Photoelectric Switch 1>

Figure 1A:
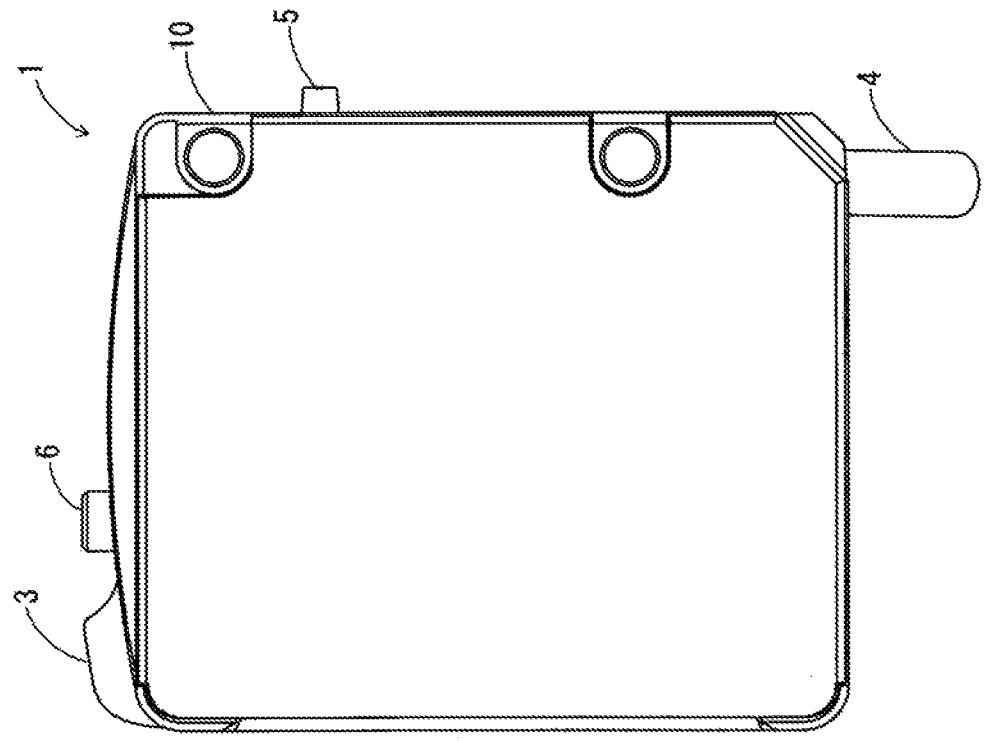
FIGS. 1A and 1B are plan views showing one configuration example of a photoelectric switch according to an embodiment of the present invention.
Figure 1B:
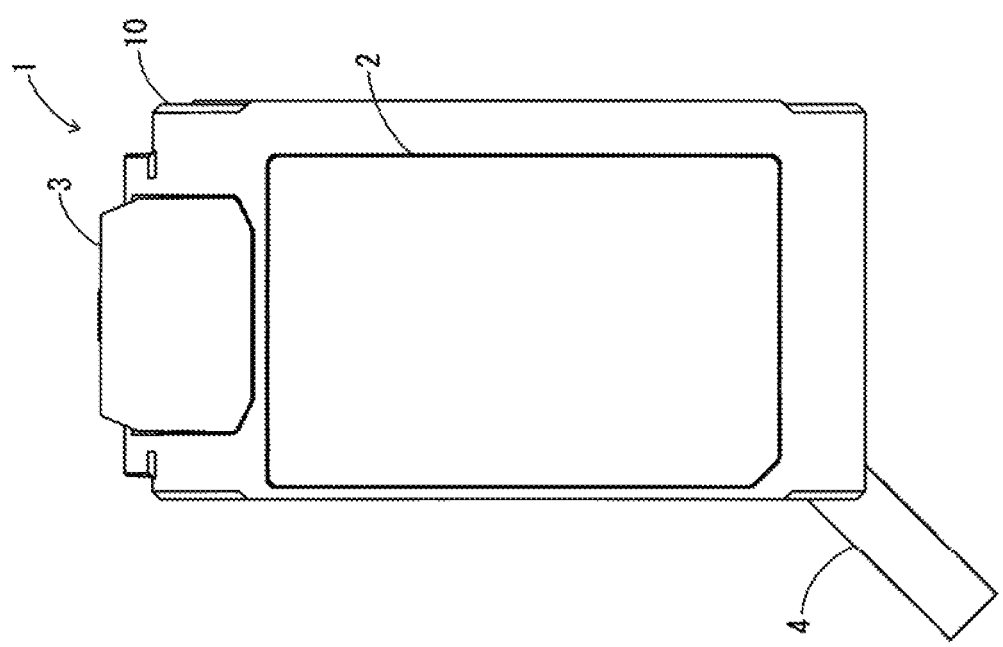
Figure 2A:
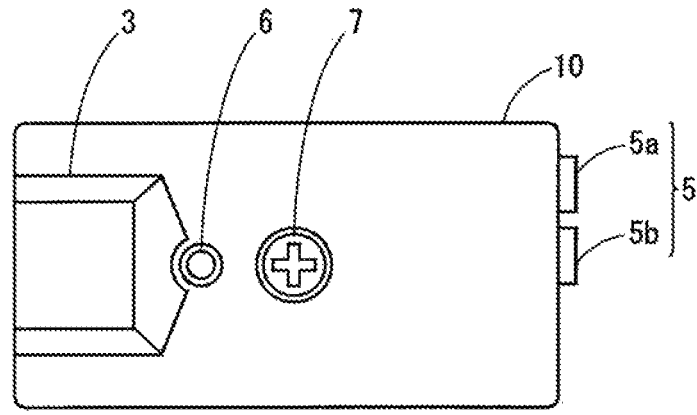
FIGS. 2A and 2B are plan views showing an upper surface and a rear surface of a casing, respectively.
Figure 2B:
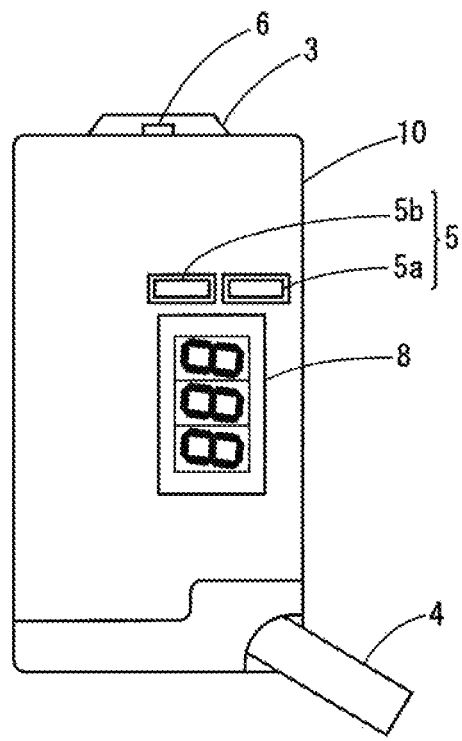

FIGS. 1A and 1B are plan views showing one configuration example of a photoelectric switch 1 according to an embodiment of the present invention, which is a color discrimination-type photoelectric switch 1. FIG. 1A shows the front surface of a casing 10, and FIG. 1B shows a right lateral surface of the casing 10. FIGS. 2A and 2B are plan views showing the upper surface and the rear surface of the casing 10. FIGS. 2A shows a display lamp 3, an operation key 6, and an adjuster spring 7 which are provided on the upper surface. FIG. 2B shows an operation key 5 and a display panel 8 which are provided on the rear surface.

The photoelectric switch 1 is a detector that projects detected light and receives reflected light from a detection area to perform workpiece determination, and then outputs a detection signal based on the result of the workpiece determination. The workpiece determination is performed by discriminating colors of the workpiece surface, and the detection signal indicating the quality of the workpiece or the presence or absence of the workpiece is output.

The casing 10 of the photoelectric switch 1 is a casing for accommodating circuit elements and optical components. This casing 10 is provided with a light projecting/receiving window cover 2, the display lamp 3, a wire cable 4, the operation keys 5, 6, the adjuster spring 7, and the display panel 8. The detected light is emitted from the front surface of the casing 10, and the reflected light from the detection area is incident on the front surface. The light projecting/receiving window cover 2 is a transparent plate for protection which blocks an opening for light projection/reception formed on the front surface of the casing 10. The light projecting/receiving window cover 2 is fitted to the casing 10.

The display lamp 3 is an LED (Light Emitting Diode) indicator which is lighted in accordance with the result of the workpiece determination, and is disposed at the front end of the upper surface of the casing. The operation key 6 is a press-type set key that is used at the time of specifying a reference color for workpiece determination, and is disposed on the upper surface of the casing 10. The adjuster spring 7 is an operator for changing a distance to the detection area to adjust a size of a light projection spot, and is disposed on the upper surface of the casing 10.

The operation key 5 is a press-type direction key that is used at the time of specifying a threshold for workpiece determination, and is made up of an up-key 5a and a down-key 5b. A numerical value can be incremented by operating the up-key 5a, and a numerical value can be decremented by operating the down-key 5b. The up key 5a and the down key 5b are disposed on the rear surface of the casing 10.

The wire cable 4 is made up of a power supply cable for supplying power to circuit elements in the casing 10, and a signal cable for transmitting a controlling signal and a detection signal. A leader section of the wire cable 4 is disposed at the lower end of the rear surface of the casing.

The display panel 8 is a display device for displaying a threshold for workpiece determination and a coincidence degree, and is disposed on the rear surface of the casing 10. For example, the display panel 8 is a seven-segment display. Note that an active matrix drive-type display device such as an LCD (liquid crystal display) may be used for the display panel 8.

Figure 3:
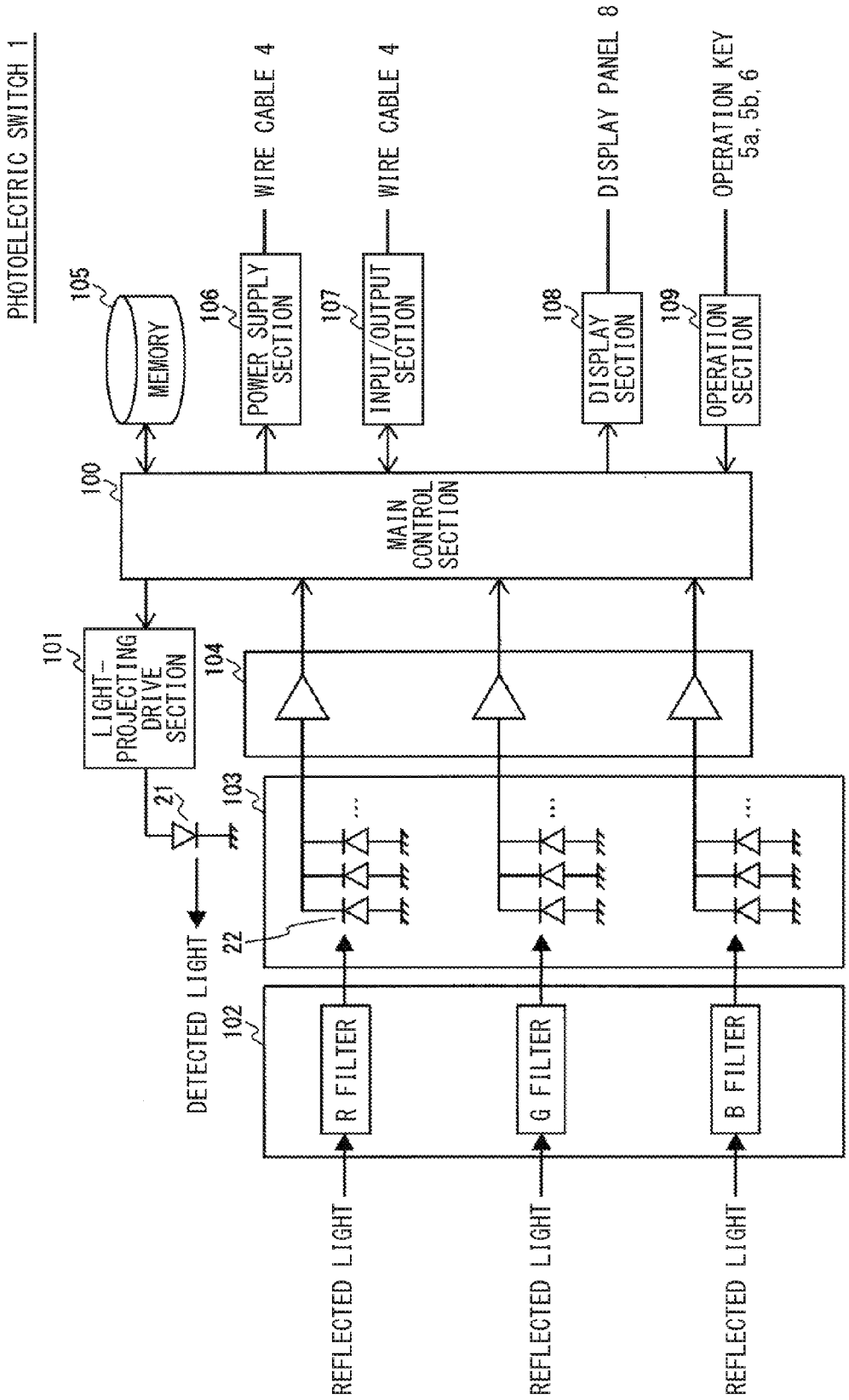
FIG. 3 is a block diagram showing one example of a function configuration in the photoelectric switch of FIGS. 1A and 1B.

FIG. 3 is a block diagram showing one example of a function configuration in the photoelectric switch 1 of FIGS. 1A and 1B. This photoelectric switch 1 is made up of a main control section 100, a light projection driving section 101, a color filter 102, a light receiving element unit 103, an amplification section 104, a memory 105, a power supply section 106, an input/output section 107, a display section 108, and an operation section 109.

The main control section 100 controls projected/received light, and performs the workpiece determination based on a light reception signal. The light projection driving section 101 drives a light emitting diode 21 based on an instruction of the main control section 100. For example, the light projection driving section 101 performs the driving by a high frequency pulse having been adjusted so as to keep an average current constant.

The light emitting diode 21 is a light emitting element that generates detected light containing two or more color components with different hues. This light emitting diode 21 is made of a semiconductor chip that generates white light as detected light, and mounted on the surface of the circuit board. For example, the light emitting diode 21 is a white LED (Light Emitting Diode) for generating white light by mixing lights of two colors having a complementary relation.

The detected light is emitted via a light projecting lens, not shown. The light projecting lens forms an image of the detected light in the detection area. As the light projecting lens, there is used a chromatic aberration correcting lens for suppressing chromatic aberration, such as an achromatic lens configured of two or more optical lenses with dispersion powers different from each other. Meanwhile, the reflected light from the detection area is incident via a light receiving lens, not shown. The light receiving lens forms an image of the reflected light on the light receiving surface of the light receiving element unit 103.

The light receiving element unit 103 selectively receives the reflected light from the detection area in association with two or more specific wavelengths, and generates two or more light reception signals respectively corresponding to light receiving amounts for the respective specific wavelengths. This light receiving element unit 103 is a multi-divisional PD unit where two or more PDs (Photo Diodes) 22 are two-dimensionally arrayed on the circuit board. For example, the PDs 22 are arrayed in a 12×24-matrix form.

The color filter 102 is an optical element that selectively transmits light of a color component with a specific wavelength in accordance with a two-dimensional position, and is disposed on the light receiving surface of the light receiving element unit 103. In this color filter 102, an R filter area, a G filter area, and a B filter area, which respectively and selectively transmit red light, green light, and blue light, are arranged in a matrix form. Any of the R filter area, the G filter area, and the B filter area is made up of a minute rectangular area, and formed in association with the PD 22.

The amplification section 104 is an amplifier unit that amplifies a light reception signal input from each PD 22 and outputs the amplified signal to the main control section 100. This amplification section 104 can switch a gain. The light reception signal is amplified for each color component of the specific wavelength and output to the main control section 100.

The memory 105 holds a threshold for workpiece determination, color information of a reference color, and the like. The power supply section 106 is connected to external equipment such as a controller via the wire cable 4, and supplies a direct current to the main control section 100 and the light projection driving section 101 based on control of the main control section 100. The input/output section 107 is connected to the external equipment such as the controller via the wire cable 4. The input/output section 107 receives a controlling signal, outputs the received signal to the main control section 100, and transmits a detection signal input from the main control section 100 to the external equipment.

The display section 108 displays on the display panel 8 a threshold for workpiece determination and a coincidence degree based on control of the main control section 100. The operation section 109 generates an operation signal based on press operation on each of the operation keys 5a, 5b, 6, and outputs the generated operation signal to the main control section 100. This operation section 109 is a capture instruction accepting unit that accepts a capture instruction for capturing color information of a reference color, and inputs a capture instruction into the main control section 100 based on the press operation performed on the operation key 6.

The main control section 100 distinguishes long-press operation and short-press operation performed on the operation key 6, to select a reference color specifying method. The long-press operation is press operation that lasts for a certain period of time or longer, and the operation start and the operation end are detected. The short-press operation is press operation that lasts shorter than the above period.

For example, any of one-point tuning, color irregularity tuning, and interpolation tuning is selected as the reference color specifying method. The one-point tuning is a method for specifying only one piece of color information as the color information of the reference color. In this method, the long-press operation on the operation key 6 is detected to capture color information, and it is specified as the reference color.

The color irregularity tuning is a method for sequentially specifying two or more reference colors. In this method, the short-press operation on the operation key 6 and the subsequent long-press operation thereon are detected. In the color irregularity tuning, color information having been captured based on the short-press operation on the operation key 6 is specified as the color information of the start reference color, and color information of one or more than one additional reference colors is specified out of color information having been captured based on the long-press operation after the short-press operation.

The interpolation tuning is a method for specifying an interpolated reference color that interpolates color information between two reference colors. In this method, simultaneous long-press operation on the operation key 6 and the operation key 5a is detected to capture color information. In the interpolation tuning, color information having been captured based on the first short-press operation on the operation key 6 is specified as the color information of the start reference color, and color information having been captured based on the subsequent short-press operation is specified as the color information of the additional reference color. When the additional reference color is newly specified, one or more than one interpolated reference colors that interpolate color information are automatically specified between the additional reference color and the reference color having been specified before the additional reference color.

For example, the interpolation tuning may be tuning that is performed in the case of adding a reference color after a reference color is set by the one-point tuning or the color irregularity tuning. In the case of performing the interpolation tuning after setting a reference color by the one-point tuning, namely, after setting a reference color by long-pressing the operation key 6 with respect to a workpiece to be detected, the reference color in the one-point tuning becomes the start reference color. While the additional reference color is specified by the interpolation tuning, one or more than one interpolated reference colors are automatically specified as needed so that colors between the start reference color and the additional reference color can be continuously detected.

Further, in the case of performing the interpolation tuning after setting a reference color by the color irregularity tuning, the additional reference color is specified by the interpolation tuning with respect to a plurality of reference colors set by the color irregularity tuning, and coincidence degrees between the specified additional reference color and the plurality of reference colors are obtained. Then, one or more than one interpolated reference colors are automatically specified as needed so that a color between the reference color and the additional reference color having the highest coincidence degree of the obtained coincidence degrees can be continuously detected.

<Main Control Section 100>

FIG. 4 is a block diagram showing a configuration example of the main control section 100 of FIG. 3. This main control section 100 is made up of a light projecting amount control section 110, a color information acquiring section 111, a reference color specifying section 112, a reference color storing section 113, a coincidence degree calculating section 114, a detection signal generating section 115, a capture period specifying section 116, a determination threshold specifying section 117, a determination threshold storing section 118, and a notification section 119.

Based on a light reception signal input from the amplification section 104, the light projecting amount control section 110 controls the light projection driving section 101 to adjust an amount of light projected by the light emitting diode 21. For example, in a case where the light receiving amount of the reflected light exceeds a certain level, the following control is performed: the light projecting amount is decreased, and when the light receiving amount falls below a certain level, the light projecting amount is increased to return to its original state.

In this light projecting amount control section 110, based on the light reception signal input from the amplification section 104, the amplification section 104 is controlled to switch a gain. For example, in a case where the light receiving amount of the reflected light exceeds a certain level, the following control is performed: the gain of the amplification section 104 is decreased, and when the light receiving amount of the reflected light falls below a certain level, the gain of the amplification section 104 is increased to return to its original state. The above control of the light projecting amount control is performed based on a light receiving amount of any of RGB. Alternatively, it is performed based on a parameter obtained by combining each of the light receiving amounts of RGB.

The color information acquiring section 111 acquires color information based on two or more light reception signals corresponding to two or more specific wavelengths, and outputs the acquired color information to the coincidence degree calculating section 114 and the reference color specifying section 112. The acquired color information is defined based on light receiving amount levels of the three colors. For example, when it is assumed that the light receiving amount level of red light is $R_1$, the light receiving amount level of green light is $G_1$, the light receiving amount level of blue light is $B_1$, and a sum of the light receiving amount levels is: $M_k=R_k+G_k+B_k$, a color is represented by a set $(r_1, g_1, b_1)$ by use of ratios of the light receiving amount levels of the three colors: $r_k=R_k/M_k$, $g_k=G_k/M_k$, $b_k=B_k/M_k$. The color information $(r_1, g_1, b_1)$ is periodically repeatedly acquired.

Based on a capture instruction from the operation section 109, the reference color specifying section 112 specifies color information $(r_0, g_0, b_0)$ acquired by the color information acquiring section 111 as the color information of the reference color. The reference color storing section 113 then holds the color information $(r_0, g_0, b_0)$ of the reference color registered by the reference color specifying section 112.

The coincidence degree calculating section 114 compares the color information $(r_1, g_1, b_1)$ acquired by the color information acquiring section 111 with the color information $(r_0, g_0, b_0)$ of the reference color registered into the reference color storing section 113, to calculate a coincidence degree C. of both color information, and outputs the coincidence degree C. to the detection signal generating section 115. The coincidence degree C. is a parameter indicating a coincidence degree of colors, to quantitatively evaluate how much a color to be compared is similar to the color registered as the reference for the workpiece determination.

For example, the coincidence degree C. is represented by an integer in a range not smaller than 0 and not larger than 999. When the color to be compared is completely coincident with the reference color, the coincidence degree C. is 999. The display section 108 displays on the display panel 8 the coincidence degree C. calculated by the coincidence degree calculating section 114. Although the set $(r_k, g_k, b_k)$ of $r_k, g_k, b_k$ as the ratios of the light receiving amount levels of the respective colors has been exemplified as the color information, in the present invention, the configuration of the color information is not restricted to this example. For example, a set $(R_k, G_k, B_k)$ of the light receiving amount level of the red light, the light receiving amount level of the green light, and the light receiving amount level of the blue light may be used as the color information. Further, the color information is not restricted to the RGB color system, but a set made up of values of respective color components based on a color system such as Lab may be taken as the color information.

The detection signal generating section 115 compares the coincidence degree C., calculated by the coincidence degree calculating section 114, with a previously defined detection determination threshold Cd to perform the workpiece determination. The detection signal generating section 115 then generates a detection signal and outputs it to the input/output section 107. The detection signal is generated based on the result of the workpiece determination. In an operation mode, the coincidence degree C. is calculated every time the color information is newly acquired, and the workpiece determination is performed.

The capture period specifying section 116 specifies a reference color capturing period based on the capture instruction from the operation section 109. The reference color capturing period is a parameter adjustment period in the color irregularity tuning, and is specified by distinguishing the short-press operation and the long-press operation performed on the operation key 6. For example, the time for the short-press operation on the operation key 6 and a period from the operation start to the operation end of the long-press operation after the short-press operation are the reference color capturing period.

The reference color specifying section 112 specifies two or more reference colors based on the capture instruction from the operation section 109. That is, the reference color specifying section 112 takes color information acquired within the reference color capturing period as color information of a candidate color, and compares the coincidence degree C. between the candidate colors with an addition determination threshold Ct, to specify the reference color.

Specifically describing the reference color specifying method in the color irregularity tuning, the reference color specifying section 112 specifies a candidate color, acquired first in the reference color capturing period, as the start reference color, and stores color information of the start reference color into the reference color storing section 113. The color information of the start reference color is acquired based on the short-press operation on the operation key 6.

Next, when the candidate color is newly acquired, the reference color specifying section 112 specifies the candidate color as an additional reference color when the coincidence degree C. of the candidate color with respect to the start reference color is lower than the addition determination threshold Ct, and stores color information of the additional reference color into the reference color storing section 113. On the other hand, the reference color specifying section 112 does not specify the candidate color as the additional reference color when the coincidence degree C. is not lower than the addition determination threshold Ct. The reference color storing section 113 then holds the color information of the start reference color and the color information of the additional reference color.

When the candidate color is newly acquired, the coincidence degree calculating section 114 compares the color information of the candidate color with the color information of the start reference color to calculate the coincidence degree C., and also compares the color information of the candidate color with the color information of all the additional reference colors specified before the acquirement of the candidate color to calculate coincidence degrees C. The reference color specifying section 112 compares, with the addition determination threshold Ct, the highest coincidence degree C. of the coincidence degree C. with respect to the start reference color and the coincidence degrees C. with respect to the additional reference colors, to specify the additional reference color.

When the additional reference color is newly specified by the reference color specifying section 112, the notification section 119 notifies the user that the reference color has been added. Specifically, the display lamp 3 is lighted to notify the addition of the reference color to the user. For example, when the reference color is added, the display lamp 3 is lighted with a display color different from that at the time of the workpiece determination. Further, the display lamp 3 is lighted just for a certain period of time every time the reference color is newly specified.

The display section 108 displays on the display panel 8 the highest coincidence degree C. of the coincidence degree C. with respect to the start reference color and the coincidence degree C. with respect to the additional reference color. With such a configuration, it is possible to move the workpiece or change the position of the workpiece while confirming the coincidence degree C. to be used for the addition determination as to whether or not to add the candidate color to the reference color.

The determination threshold specifying section 117 specifies the detection determination threshold Cd and the addition determination threshold Ct based on the operation signal from the operation section 109, and stores those thresholds into the determination threshold storing section 118. The determination threshold storing section 118 then holds the detection determination threshold Cd and the addition determination threshold Ct registered by the determination threshold specifying section 117. By operating the operation keys 5a or 5b, the detection determination threshold Cd and the addition determination threshold Ct can be arbitrarily specified or changed. The detection determination threshold Cd and the addition determination threshold Ct may be the same values.

The display section 108 displays on the display panel 8 either the detection determination threshold Cd or the addition determination threshold Ct specified by the determination threshold specifying section 117 in accordance with the operating situation. That is, the detection determination threshold Cd is displayed in the operation mode. On the other hand, the addition determination threshold Ct is displayed during the color irregularity tuning.

When the color information is newly acquired in the operation mode, the coincidence degree calculating section 114 compares the color information with the color information of the start reference color to calculate the coincidence degree C., and also compares the color information with the color information of the additional reference color to calculate coincidence degree C. When the color information is newly acquired, the detection signal generating section 115 compares, with the detection determination threshold Cd, the highest coincidence degree of the coincidence degrees C. calculated by respectively comparing the color information with color information of two or more reference colors, to perform the workpiece determination.

Next, the reference color specifying method in the interpolation tuning will be described. After setting the reference color by the one-point tuning or the color irregularity tuning, the reference color specifying section 112 specifies the additional reference color and the interpolated reference color based on the simultaneous long-press operation on the operation key 6 and the operation key 5a, and stores those colors into the reference color storing section 113. That is, when the simultaneous long-press operation performed on the operation key 6 and the operation key 5a is detected after setting of the reference color by the one-point tuning, the reference color specifying section 112 takes the reference color in the one-point tuning as the start reference color, specifies the newly acquired color information as the color information of the additional reference color, and specifies one or more than one interpolated reference colors as needed so that colors between the start reference color and the additional reference color can be continuously detected.

Further, when the simultaneous long-press operation performed on the operation key 6 and the operation key 5a is detected after setting of the reference color by the color irregularity tuning, the reference color specifying section 112 specifies the newly acquired color information as the color information of the additional reference color with respect to a plurality of reference colors set in the color irregularity tuning, and obtains the coincidence degrees C. of the specified additional reference color and the plurality of reference colors, to specify one or more than one interpolated reference colors as needed so that colors between the additional reference color and the reference color having the highest coincidence degree C. can be continuously detected.

Specifically, when the coincidence degree C. calculated by comparing the color information of the additional reference color with the color information of the start reference color is not higher than a previously defined interpolation determination threshold Ch, the interpolated reference color is specified. On the other hand, when the coincidence degree C. is higher than the interpolation determination threshold Ch, the interpolated reference color is not specified.

When the additional reference color is newly specified, the coincidence degree calculating section 114 compares the color information of the additional reference color with the color information of the start reference color to calculate the coincidence degree C., and also compares the color information of the additional reference color with the color information of all the additional reference colors specified before the additional reference color and the color information of the interpolated reference color, to calculate the coincidence degrees C.

The reference color specifying section 112 compares, with the interpolation determination threshold Ch, the highest coincidence degree C. of the coincidence degree C. with respect to the start reference color, the coincidence degree C. with respect to the interpolated reference color, and the coincidence degree C. with respect to the additional reference color, to specify the interpolated reference color. When the interpolated reference color is to be specified, one or two interpolated reference colors are automatically set between the newly specified additional reference color and the reference color with the highest coincidence degree C. For example, the color information of the interpolated reference color is calculated by linear interpolation.

When the color information is newly acquired in the operation mode, the coincidence degree calculating section 114 compares the color information with the color information of the start reference color, the color information of the interpolated reference color, and the color information of the additional reference color, to respectively calculate the coincidence degrees C. The detection signal generating section 115 compares, with the detection determination threshold Cd, the highest coincidence degree C. of the coincidence degree C. with respect to the start reference color, the coincidence degree C. with respect to the interpolated reference color, and the coincidence degree C. with respect to the additional reference color, to perform workpiece determination.

The display section 108 displays on the display panel 8 the highest coincidence degree C. of the coincidence degree C. with respect to the start reference color, the coincidence degree C. with respect to the interpolated reference color, and the coincidence degree C. with respect to the additional reference color. With such a configuration, it is possible to move the workpiece or change the position of the workpiece while confirming the coincidence degree C. to be used for the interpolation determination as to whether or not to interpolate the reference color.

The determination threshold specifying section 117 specifies the interpolation determination threshold Ch based on the operation signal from the operation section 109, and stores this threshold into the determination threshold storing section 118. By operating the operation key 5a or 5b, the interpolation determination threshold Ch can be arbitrarily specified or changed. The detection determination threshold Cd and the interpolation determination threshold Ch may be the same values. The display section 108 displays on the display panel 8 the interpolation determination threshold Ch specified by the determination threshold specifying section 117.

FIGS. 5A and 5B are explanatory diagrams showing comparisons of operation of the photoelectric switch 1 of FIG. 3 with that of a comparative example, and schematically shows operation at the time of setting a reference color for workpiece determination. FIG. 5A shows the case of the photoelectric switch 1 according to the present invention, and FIG. 5B shows the comparative example. Each of these figures shows the case of plotting a measurement point of a candidate color on a two-dimensional plane within a color space, with a lateral axis taken as a color component a, and a vertical axis taken as a color component b.

In the photoelectric switch 1 of the present invention, color information acquired within the reference color capturing period is taken as the color information of the candidate color, and the coincidence degree C. between the candidate colors is compared with the addition determination threshold Ct, to specify an additional reference color 32. An area 31 is a color distribution range of a target workpiece. When the color irregularity is large, this area 31 is wide.

A start reference color 30 is a candidate color acquired first in the reference color capturing period. Further, an additional reference color 32 is a candidate color with the coincidence degree C. with respect to the start reference color 30 being lower than the addition determination threshold Ct. Measurement points of the start reference color 30 and the additional reference color 32 are in the area 31. A radius of a circle 33 added to the measurement points of the start reference color 30 and the additional reference color 32 corresponds to the addition determination threshold Ct. The higher the addition determination threshold Ct, the smaller the radius of the circle 33.

When there is contamination or gradation on the workpiece surface, the chroma and brightness greatly change even when the hue is the same. In the case of such a workpiece, a change in tint in the same workpiece is expressed as the elongated area 31. Filling the area 31 with the circles 33 enables accurate detection of a workpiece where a tint changes.

According to the present invention, since the workpiece determination is performed using the reference color having the highest coincidence degree C. out of two or more reference colors, it is possible to accurately detect such a workpiece as described above where the tint changes within the same workpiece even when the detection determination threshold Cd is set high.

In contrast, in the comparative example, one reference color 43 is specified based on two measurement points 41 and 42 where an instruction to capture color information has been made by the user. A measurement point of the reference color 43 is a median of the two measurement points 41 and 42, and each color component of the reference color 43 is made up of an average value of the color components at the measurement points 41 and 42. A radius of a circle 44 added to the measurement point of the reference color 43 corresponds to a threshold for determination. Accurate detection of the workpiece with the tint corresponding to the measurement point 41 or 42 requires the threshold for determination to be set sufficiently low. That is, accurate detection of such a workpiece where a tint changes within the same workpiece requires the radius of the circle 44 to be made sufficiently large. There has thus been a problem where an unfavorable workpiece with a completely different tint is erroneously detected.

Figure 6A:
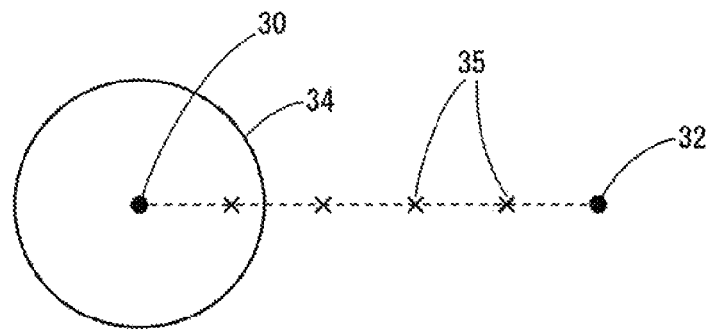
FIGS. 6A to 6C are explanatory diagrams schematically showing one example of operation at the time of setting an interpolated reference color in the photoelectric switch of FIG. 3.
Figure 6B:
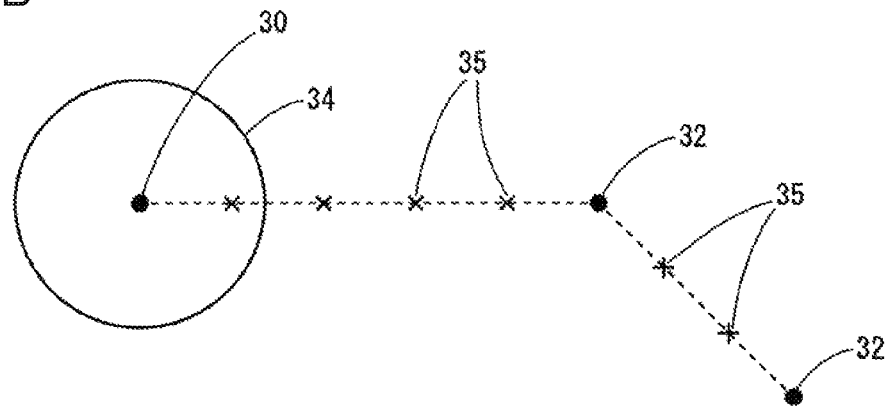
Figure 6C:
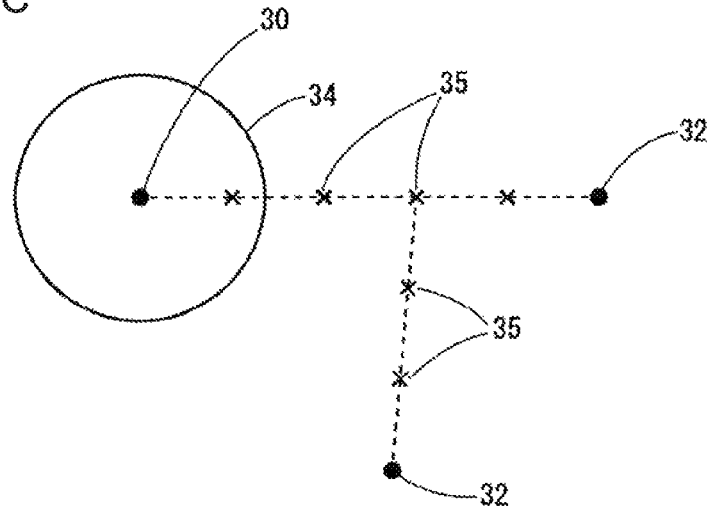

FIGS. 6A to 6C are explanatory diagrams schematically showing one example of operation at the time of setting an interpolated reference color in the photoelectric switch 1 of FIG. 3. FIG. 6A shows a case where four interpolated reference colors 35 are specified between the start reference color 30 and the additional reference color 32. When the coincidence degrees C. of the start reference color 30 and the additional reference color 32 are not higher than the interpolation determination threshold Ch, the interpolated reference color 35 is specified.

Further, a division number n in the case of specifying the interpolated reference color 35 is specified based on the coincidence degree between the start reference color 30 and the additional reference color 32 and the interpolation determination threshold Ch. (n−1) interpolated reference colors 35 are evenly disposed on a line segment connecting the two reference colors. A radius of a circle 34 added to the measurement point of the start reference color 30 corresponds to the interpolation determination threshold Ch. The higher the interpolation determination threshold Ch, the smaller the radius of the circle 34.

FIG. 6B shows a case where two interpolated reference colors 35 are specified between two additional reference colors 32. When the coincidence degree C. of the additional reference color 32 and the newly specified additional reference color 32 is not higher than the interpolation determination threshold Ch, the interpolated reference color 35 is specified.

FIG. 6C shows a case where two interpolated reference colors 35 are specified between the interpolated reference color 35 and the additional reference color 32. When the additional reference color 32 is newly specified, the color information of the additional reference color 32 is compared with the color information of the start reference color 30 to calculate the coincidence degree C., and also compared with the color information of all the additional reference colors 32 specified before the additional reference color 32 and the color information of the interpolated reference color 35, to calculate the coincidence degrees C. When the highest coincidence degree C. of the coincidence degree C. with respect to the start reference color 30, the coincidence degree C. with respect to the interpolated reference color 35, and the coincidence degree C. with respect to the additional reference color 32 is not higher than the interpolation determination threshold Ch, the interpolated reference color 35 is specified.

Figure 7:
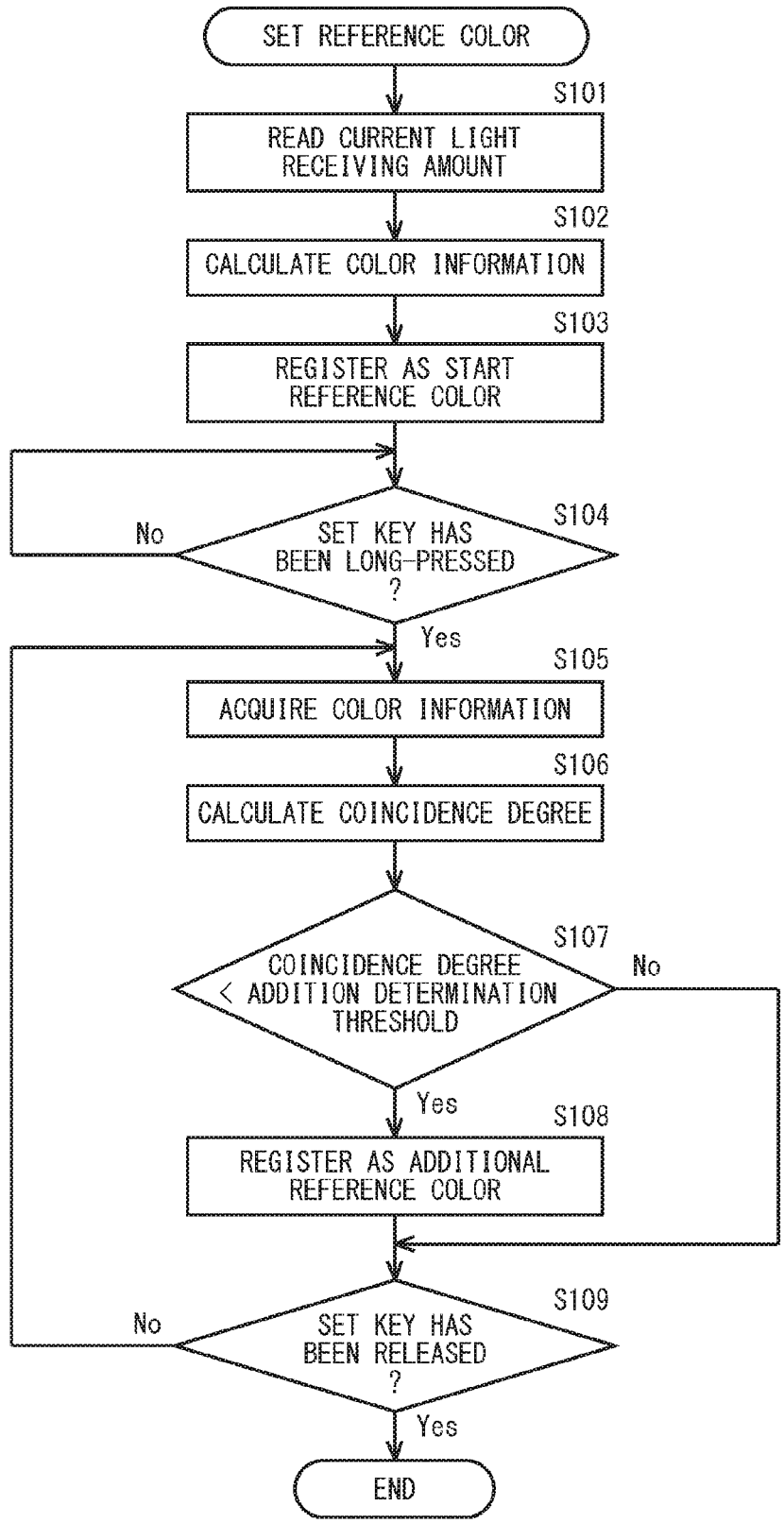
FIG. 7 is a flowchart showing one example of operation at the time of setting a reference color in the photoelectric switch of FIG. 3.

Steps S101 to S109 of FIG. 7 are a flowchart showing one example of operation at the time of setting the reference color in the photoelectric switch 1 of FIG. 3. The figure shows processing steps after detection of the short-press operation performed on the operation key 6. First, the main control section 100 reads the current light receiving amount, calculates color information made up of ratios $r_k$, $g_k$, $b_k$ of the light receiving amounts of the respective color components, and registers it as a start reference color (Steps S101 to S103).

Next, when detecting long-press operation performed on the operation key 6 (Step S104), the main control section 100 acquires color information to calculate the coincidence degree C. That is, the main control section 100 reads the current light receiving amount, calculates color information made up of ratios $r_k$, $g_k$, $b_k$ of the light receiving amounts of the respective color components, and takes it as a candidate color (Step S105). Then, the main control section 100 compares the color information of the candidate color with the color information of the start reference color, to obtain the coincidence degree C. (Step S106).

The main control section 100 compares the calculated coincidence degree C. with the addition determination threshold Ct. When the coincidence degree C. is lower than the addition determination threshold Ct, the main control section 100 specifies the candidate color as the additional reference color, and moves to the next processing step (Steps S107, S108). When the coincidence degree C. is not lower than the addition determination threshold Ct, the main control section 100 does not specify the candidate color as the additional reference color, and moves to the next processing step.

The processing steps of Step,S105 and thereafter are repeated until the operation key 6 is released, and when the operation end of the long-press operation is detected, this process is completed (Step S109). Further, in Step S106, the color information of the candidate color is compared with the color information of the start reference color, and the color information of the additional reference color specified before the candidate color, to calculate the coincidence degrees C. Then in Step S107, the highest coincidence degree C. of the coincidence degree C. with respect to the start reference color and the coincidence degree C. with respect to the additional reference color is compared with the addition determination threshold Ct, to specify the additional reference color.

Figure 8:
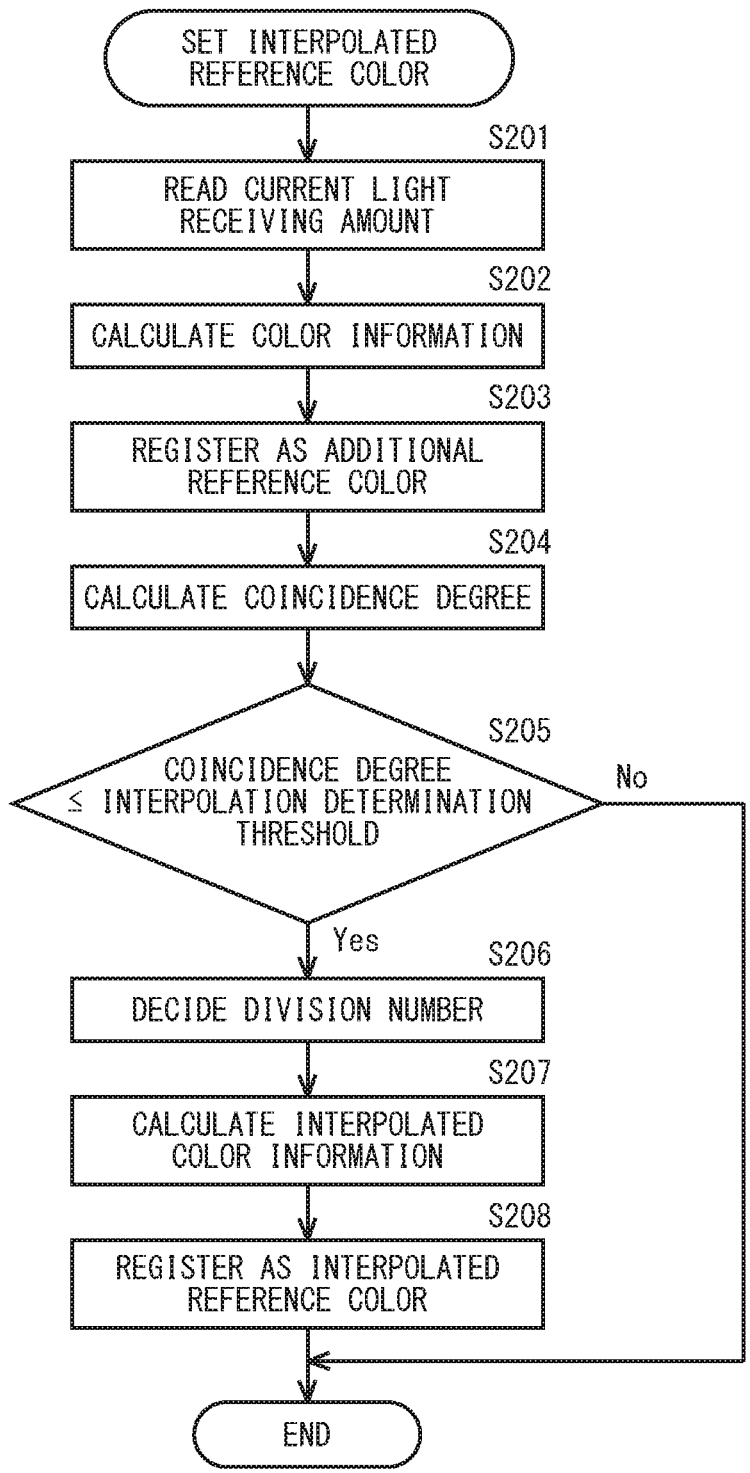
FIG. 8 is a flowchart showing one example of operation at the time of setting an interpolated reference color in the photoelectric switch of FIG. 3.

Steps S201 to S208 of FIG. 8 are a flowchart showing one example of operation at the time of setting the interpolated reference color in the photoelectric switch 1 of FIG. 3. The figure shows processing steps after detection of simultaneous long-press operation performed on the operation key 6 and the operation key 5a. First, the main control section 100 reads the current light receiving amount, calculates color information made up of ratios $r_k$, $g_k$, $b_k$ of the light receiving amounts of the respective color components, and registers it as an additional reference color (Steps S201 to S203).

Next, the main control section 100 compares this reference color with reference colors having been registered, to calculate the coincidence degree C., and compares it with the interpolation determination threshold Ch (Steps S204, S205). When the coincidence degree C. is not higher than the interpolation determination threshold Ch, the main control section 100 decides a division number n from the interpolation determination threshold Ch and the coincidence degree between the additional reference color and the reference color having the highest coincidence degree C. (Step S206). Then, the main control section 100 calculates interpolated color information from the color information of the additional reference color and the reference color having the highest coincidence degree C. and the division number n, and registers the calculated information as an interpolated reference color (Steps S207, S208). On the other hand, when the highest coincidence degree C. is higher than the interpolation determination threshold Ch, the main control section 100 does not specify the interpolated reference color, and completes this processing.

Figure 9:
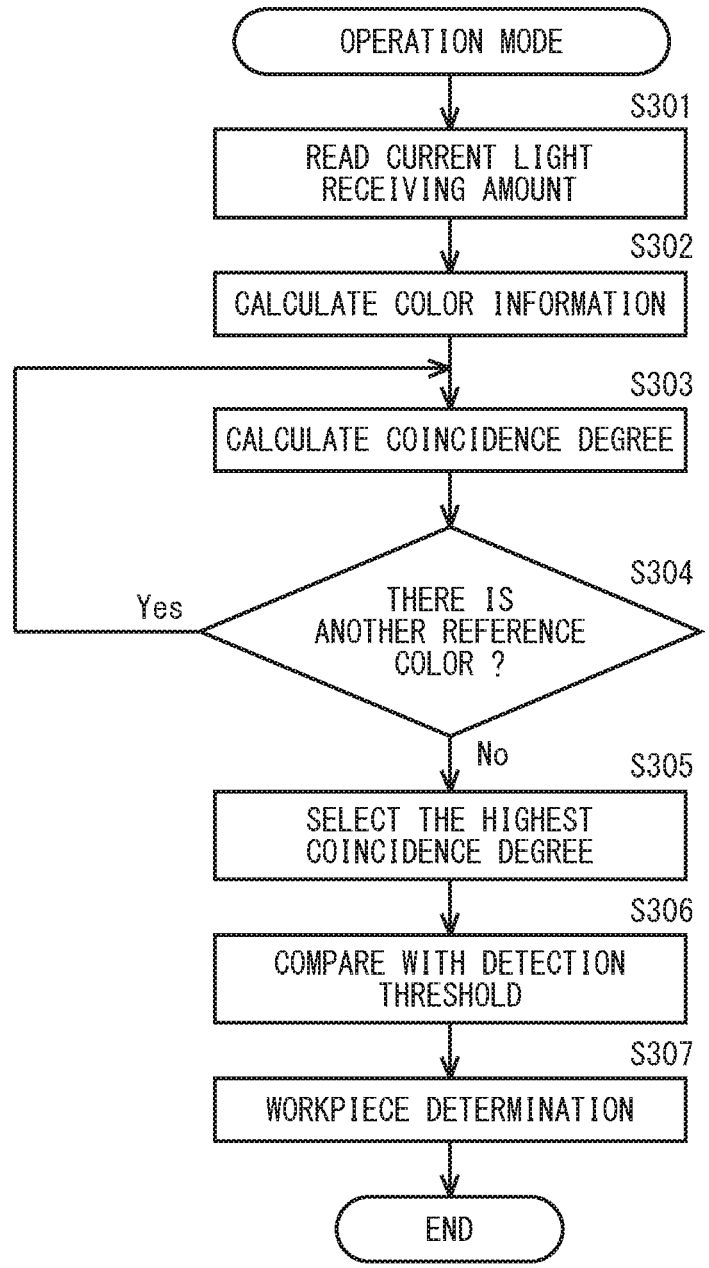
FIG. 9 is a flowchart showing one example of operation at the time of an operation mode in the photoelectric switch of FIG. 3.

Steps S301 to S307 of FIG. 9 are a flowchart showing one example of operation at the time of the operation mode in the photoelectric switch 1 of FIG. 3. First, the main control section 100 reads the current light receiving amount, and calculates color information made up of ratios $r_k$, $g_k$, $b_k$ of the light receiving amounts of the respective color component (Steps S301, S302). Next, the main control section 100 compares the acquired color information with the color information of the reference color, to calculate the coincidence degree C. (Step S303). When another reference color has been registered, the main control section 100 repeats the processing step of Step S303, and when the coincidence degrees C. are calculated with respect to all the reference colors, the main control section 100 moves to the next processing step (Step S304). That is, the coincidence degrees C. are calculated with respect to all the reference colors registered as the start reference color and the additional reference color.

Next, the main control section 100 selects the highest coincidence degree Cmax out of the coincidence degrees C. with respect to the respective reference colors (Step S305), and compares the coincidence degree Cmax with the detection determination threshold Cd, to perform the workpiece determination (Steps S306, 307). That is, when the coincidence degree Cmax is not lower than the detection determination threshold Cd, the workpiece is determined as a desired workpiece, and when the coincidence degree Cmax is lower than the detection determination threshold Cd, the workpiece is determined as a defective workpiece.

According to the present embodiment, the workpiece determination is performed using two or more reference colors, and hence the detection determination threshold Cd can be set high as compared with a case where the workpiece determination is performed using one reference color. Hence it is possible to accurately detect even such a workpiece where a tint changes within the same workpiece, while preventing erroneous detection.

Further, since the candidate colors are narrowed down by use of the coincidence degree C. between the candidate colors to specify the reference color, as compared with the case of specifying all candidate colors acquired within the reference color capturing period as the reference colors, it is possible to reduce a processing load on the workpiece determination at the time of actual operation. In particular, since the additional reference color is specified by narrowing down the candidate colors to a candidate color, the coincidence degree C. of which with respect to the start reference color is lower than the addition determination threshold Ct, as compared with the case of specifying all candidate colors acquired after the specification of the start reference color as the additional reference colors, it is possible to reduce a processing load on the workpiece determination.

Further, since the additional reference color is specified by narrowing down the reference colors to a reference color with the highest coincidence degree C., as compared with the case of comparing the coincidence degrees C. with respect to all reference colors with the addition determination threshold Ct, it is possible to reduce a processing load on addition determination as to whether or not to make an addition to the reference color.

Moreover, since the addition of the reference color is notified, the user can easily distinguish that the reference color has been newly added. For this reason, the user can easily recognize how the workpiece is to be moved, or how the position of the workpiece is to be changed, so as to change the tint and add the reference color. Hence it is possible to significantly improve the operability at the time of setting the reference color for the workpiece determination. Further, while the reference color continues to be added by moving the workpiece or changing the position of the workpiece, it is indicated that the reference colors have been in short. When the reference color is not added even by moving the workpiece or changing the position of the workpiece, it is indicated that reference color capturing operation has been sufficiently performed. Accordingly, the user can determine whether the reference color capturing operation is to be continued or completed by the help of the notification unit.

According to the present embodiment, since the workpiece determination is performed using two or more reference colors, the detection determination threshold Cd can be set high as compared with the case of performing the workpiece determination by use of one reference color. Hence it is possible to accurately detect even such a workpiece where a tint changes among manufacturing lots, while preventing erroneous detection.

Further, since one or more than one interpolated reference colors that interpolate color information between the start reference color and the additional reference color are automatically specified, it is possible to spare the trouble of instructing to capture the interpolated reference color. Further, the interpolated reference color is specified based on the color information of the start reference color and the color information of the additional reference color. For this reason, as compared with the case of setting the interpolated reference color regardless of the coincidence degree between the start reference color and the additional reference color, the number of interpolated reference colors is suppressed, thereby enabling reduction in processing load on the workpiece determination at the time of actual operation.

Further, since the interpolated reference color is specified in accordance with the coincidence degree C. between the start reference color and the additional reference color, as compared with the case of setting the interpolated reference color regardless of the coincidence degree C. between the start reference color and the additional reference color, it is possible to reduce a processing load on the workpiece determination at the time of actual operation.

With such a configuration, the candidate colors are narrowed down to a reference color with the highest coincidence degree C. to specify the interpolated reference color. For this reason, as compared with the case of comparing the coincidence degrees C. with respect to all reference colors with the interpolation determination threshold Ch, it is possible to reduce a processing load on interpolation determination as to whether or not to interpolate the reference color.

Note that in the present embodiment, there has been described the example of the case where the coincidence degree C. is calculated based on the ratios $r_k$, $g_k$, $b_k$ of the light receiving amount levels of the three colors, but in the present invention, the method for calculating the coincidence degree C. is not restricted to this example. It may be configured such that the coincidence degree C. is obtained based on the ratios $r_k$, $g_k$, $b_k$ of the light receiving amount levels of the three colors and a sum $M_k$ of the light receiving amounts. The use of such a coincidence degree C. allows accurate detection of not only a chromatic workpiece but also such a workpiece where the hue and the chroma are the same and only the brightness is different, especially an achromatic workpiece having white-and-black shades.

Further, in the present embodiment, the example of the case has been described where, at the time of addition of the reference color, the display lamp 3 is lighted for notification. However, in the present invention, the notification method at the time of addition of the reference color is not restricted to this example. For example, addition of the reference color may be notified to the user by a voice output.

Further in the present embodiment, the example of the case has been described where a reference color capturing instruction is input based on the press operation on the operation key 6. However, in the present invention, the method for instructing to capture a reference color is not restricted to this example. For example, color information may be captured based on a trigger signal input from the external equipment such as the controller, and specified as the color information of the reference color.

Further in the present embodiment, the example of the case has been described where the reference color capturing period is defined by the short-press operation of operation key 6 and the long-press operation thereafter. However, in the present invention, the method for specifying the reference color capturing period is not restricted to this example. For example, a period from the first short-press operation performed on the operation key 6 to the second short-press operation performed thereon may be taken as the reference color capturing period. Alternatively, a period from the first short-press operation performed on the operation key 6 until the lapse of a certain time period may be taken as the reference color capturing period. Alternatively, a period from the first short-press operation performed on the operation key 6 until the number of pieces of color information captured exceeds a certain number may be taken as the reference color capturing period.

Further in the present embodiment, the example of the case has been described where white light containing two or more color components with different hues is used as the detected light. However, in the present invention, the light source for light projection is not restricted to this example. For example, three light emitting elements respectively generating red, green and blue detected light may be provided as the light source for light projection, and each light emitting element may be sequentially turned on in a time-division manner.

Further in the present embodiment, the example of the case has been described where reflected light is received using the light receiving element unit 103 made up of the multi-divisional PD units. However, in the present invention, the configuration of the light receiving element unit 103 is not restricted to this example. For example, it may be configured such that a spectroscope for dispersing reflected light into the three color components and three light receiving elements for receiving the respective color components may be provided as the light receiving element unit 103. Alternatively, it may be configured such that, when the red, green, and blue detected light is to be sequentially projected in a time-division manner, one light receiving element is provided as the light receiving element unit 103.

What is claimed is:

1. A photoelectric switch comprising:
a light projector configured to project a light toward a detection area;
a light receiver configured to receive the light from the detection area to generate a plurality of light reception signals respectively corresponding to a plurality of specific wavelengths; and
a controller configured to repeatedly acquire a receiving color based on the plurality of light reception signals respectively corresponding to the plurality of specific wavelengths,
configured to accept at least one of capture instructions to capture a plurality of reference colors,
configured to specify the receiving colors acquired in response to the at least one of capture instructions as the plurality of reference colors,
configured to compare the receiving color repeatedly acquired with each of the plurality of reference colors to calculate a coincidence degree between the receiving color repeatedly acquired and the plurality of reference colors, and configured to compare the coincidence degree with a predetermined threshold to generate a detection signal representing a workpiece determination;
wherein, when the receiving color is newly acquired, the controller compares, with the predetermined threshold, the highest coincidence degree of coincidence degrees calculated by respectively comparing the receiving color newly acquired, with each of the plurality of reference colors, to generate the detection signal.

2. The photoelectric switch according to claim 1, wherein the controller specifies, as a candidate color, the receiving color acquired within a reference color capturing period defined in accordance with the capture instruction, and compares a candidate color coincidence degree between the candidate color and the reference color with a predetermined addition threshold, to specify the candidate color as the reference color.

3. The photoelectric switch according to claim 2, wherein the controller specifies a candidate color, acquired first in the reference color capturing period, as a start reference color included in the reference color, and
in a case where the candidate color is newly acquired,
the controller specifies the candidate color newly acquired, as an additional reference color included in the reference color when the candidate color coincidence degree between the candidate color newly acquired, and the start reference color is lower than the predetermined addition threshold,
the controller does not specify the candidate color newly acquired, as the additional reference color when the candidate color coincidence degree is not lower than the predetermined addition threshold.

4. The photoelectric switch according to claim 3, wherein when the candidate color is newly acquired, the controller respectively compares the candidate color newly acquired, with the start reference color and the additional reference color to respectively calculate the candidate color coincidence degrees, and
the controller compares, with the predetermined addition threshold, the highest candidate color coincidence degree of the candidate color coincidence degrees, to specify the candidate color newly acquired, as the additional reference color.

5. The photoelectric switch according to claim 2, comprising
a display configured to display the highest coincidence degree of the coincidence degree with respect to the start reference color and the coincidence degree with respect to the additional reference color.

6. The photoelectric switch according to claim 5, wherein the controller further configured to specify the predetermined threshold and the predetermined addition threshold based on press operation of an operation key, and
the display displays the predetermined threshold and the predetermined addition threshold.

7. The photoelectric switch according to claim 3, comprising
a notification device configured to notify an addition of the reference color every time the additional reference color is newly specified.

8. The photoelectric switch according to claim 2, wherein the controller further configured to specify the reference color capturing period based on press operation of an operation key.

9. A photoelectric switch comprising:
a light projector configured to project a light toward a detection area;

a light receiver configured to receive the light from the detection area to generate a plurality of light reception signals respectively corresponding to a plurality of specific wavelengths; and a controller configured to repeatedly acquire a receiving color based on the plurality of light reception signals respectively corresponding to the plurality of specific wavelengths, configured to accept at least one of capture instructions to capture a plurality of reference colors including a start reference color, an additional reference color and an interpolated reference color, configured to specify the receiving colors acquired in response to the at least one of capture instructions as the start reference color, the additional reference color and the interpolated reference color, configured to compare the receiving color repeatedly acquired with each of the plurality of reference colors to calculate a coincidence degree between the receiving color repeatedly acquired and the plurality of reference colors, and configured to compare the coincidence degree with a predetermined threshold to generate a detection signal representing a workpiece determination;

wherein the controller specifies the receiving color acquired based on a first one of the capture instructions, as the start reference color, and specifies the receiving color acquired based on a second one of the capture instructions after the first one of the capture instructions, as the additional reference color, and specifies at least one interpolated reference color that interpolate a color between the start reference color and the additional reference color based on the start reference color and the additional reference color, when the receiving color is newly acquired, the controller compares the receiving color newly acquired, with the start reference color, the interpolated reference color, and the additional reference color, to respectively calculate the coincidence degrees, and the controller compares, with the predetermined threshold, the highest coincidence degree of the coincidence degree with respect to the start reference color, the coincidence degree with respect to the interpolated reference color, and the coincidence degree with respect to the additional reference color, to generate the detection signal.

10. The photoelectric switch according to claim 9, wherein the controller specifies the interpolated reference color when a reference color coincidence degree calculated by comparing the additional reference color with the color start reference color is not higher than a predetermined interpolation determination threshold, and the controller does not specify the interpolated reference color when the reference color coincidence degree is higher than the predetermined interpolation threshold.

11. The photoelectric switch according to claim 10, wherein when the additional reference color is newly specified, the controller compares the additional reference color newly specified, with the start reference color to calculate a reference color coincidence degree, and also compares the additional reference color newly specified, with the additional reference colors previously specified, to calculate coincidence degrees, and the controller compares, with the predetermined interpolation threshold, the highest coincidence degree of the coincidence degree with respect to the start reference color, the coincidence degree with respect to the interpolated reference color, and the coincidence degree with respect to the additional reference color, to specify the interpolated reference color.

12. The photoelectric switch according to claim 11, comprising a display configured to display the highest coincidence degree of the coincidence degree with respect to the start reference color, the coincidence degree with respect to the interpolated reference color, and the coincidence degree with respect to the additional reference color.

13. The photoelectric switch according to claim 12, wherein the controller specifies the predetermined threshold and the predetermined interpolation threshold based on press operation of an operation key, and the display displays the predetermined threshold and the predetermined interpolation threshold.

14. A photoelectric determination method for generating a detection signal representing a workpiece determination, the method comprising:

projecting a light toward a detection area;

receiving the light from the detection area to generate a plurality of light reception signals respectively corresponding to a plurality of specific wavelengths;

repeatedly acquiring a receiving color based on the plurality of light reception signals respectively corresponding to the plurality of specific wavelengths;

accepting at least one of capture instructions to capture a plurality of reference colors;

specifying the receiving colors acquired in response to the at least one of capture instructions as the plurality of reference colors;

comparing the receiving color repeatedly acquired with each of the plurality of reference colors to calculate the highest coincidence degree of a plurality of coincidence degrees between the receiving color repeatedly acquired and each of the plurality of reference colors; and comparing the highest coincidence degree with a predetermined threshold to generate a detection signal representing a workpiece determination.

* * * * *